United States Patent [19]
Fan et al.

[11] Patent Number: 5,805,375
[45] Date of Patent: Sep. 8, 1998

[54] WOBBLE MOTOR MICROACTUATOR FOR FINE POSITIONING AND DISK DRIVE INCORPORATING THE MICROACTUATOR

[75] Inventors: Long-Sheng Fan; Robert Edward Fontana, Jr., both of San Jose, Calif.; Tomotake Furuhata, Yokohama, Japan; Timothy Clark Reiley, Los Gatos; Hans Helmut Zappe, San Jose, both of Calif.

[73] Assignee: International Business Machines Corporation, Armonk, N.Y.

[21] Appl. No.: 703,111

[22] Filed: Aug. 22, 1996

Related U.S. Application Data

[63] Continuation of Ser. No. 284,334, Aug. 1, 1994, abandoned.

[51] Int. Cl.[6] ............................. G11B 5/596; H02N 1/100
[52] U.S. Cl. ..................................... 360/78.12; 360/78.13; 360/78.04; 310/309; 310/82
[58] Field of Search .............................. 360/78.12, 78.13, 360/78.01, 78.04; 310/309, 308, 80, 82

[56] References Cited

U.S. PATENT DOCUMENTS

| | | | |
|---|---|---|---|
| 4,943,750 | 7/1990 | Howe et al. | 310/309 |
| 5,041,932 | 8/1991 | Hamilton | 360/104 |
| 5,043,043 | 8/1991 | Howe et al. | 156/645 |
| 5,079,653 | 1/1992 | Gauthier et al. | 360/78.13 |
| 5,093,594 | 3/1992 | Mehregany | 310/82 |
| 5,172,287 | 12/1992 | Ishida | 360/78.12 |
| 5,180,940 | 1/1993 | Paratte et al. | 310/40 MM |
| 5,202,803 | 4/1993 | Albrecht et al. | 360/97.02 |
| 5,339,206 | 8/1994 | Takahashi | 360/78.12 |
| 5,539,267 | 7/1996 | Fan et al. | 360/99.08 X |

OTHER PUBLICATIONS

S. C. Jacobsen et al., "The Wobble Motor: Design, Fabrication and Testing of An Eccentric–motion Electrostatic Microactuator", IEEE, 1989, pp. 1536–1546.

S. C. Jacobsen et al., "Design, Analysis, and Experimental Results for the Wobble Motor: An Eccentric–motion Electrostatic Microactuator", SPIE vol. 1167, Precision Engineering and Optomechanics, 1989, pp. 122–136.

S. C. Jacobsen et al., "Micromotors Split Hairs", IEEE Potentials, Feb. 1991, pp. 12–15.

M. Mehregany et al., "Friction and Wear in Microfabricated Harmonic Side–drive Motors", 1990 IEEE Solid State Sensor and Actuator Workshop—Technical Digest, pp. 17–22.

L. Paratte et al., "A Rigid Ring Electrostatic Harmonic Wobble Motor with Axial Field", 1991 IEEE International Conference on Solid–state Sensors and Actuators, pp. 890–893.

R. H. Price et al., "Field Analysis for the Electrostatic Eccentric Drive Micromotor ('Wobble Motor')", Journal of Electrostatics, vol. 28, 1992, pp. 7–38.

*Primary Examiner*—Aristotelis M. Psitos
*Assistant Examiner*—Larry T. Cullen
*Attorney, Agent, or Firm*—Thomas R. Berthold

[57] ABSTRACT

A microfabricated wobble motor with a positioning arm attached to the wobble motor rotor acts as a fine positioner with bidirectional movement. The primary application is a rotary actuator for the read/write head in a very small magnetic recording disk drive. An integrated head-arm assembly is attached at one end to the rotor of the wobble motor. The other end of the head-arm assembly has a head carrier that is maintained in contact with the disk. Head position error information is read from the disk and used to provide control signals to each of the stator elements. The stator elements are sequentially addressed by applying a voltage from a driver circuit. This causes the rotor to be electrostatically attracted to the activated stators, so that the rotor is movable bidirectionally. The read/write head can thus be moved bidirectionally to any of the data tracks on the disk and maintained on a desired data track for reading or writing data. The fine positioner also includes a digital control system where each of the stator elements is represented by an address, and the movement of the rotor is controlled by incrementing or decrementing the stator address in an address register.

5 Claims, 8 Drawing Sheets

WOBBLE MOTOR MICROACTUATOR FOR FINE POSITIONING AND DISK DRIVE INCORPORATING THE MICROACTUATOR

This is a continuation of application Ser. No. 08/284,334 filed on Aug. 1, 1994 now abandoned.

TECHNICAL

This invention relates in general to actuators for fine positioning, and more particularly to a fine-positioning actuator that uses a micromechanical wobble motor. The primary application of the actuator is for positioning the read/write heads in very small disk drives.

BACKGROUND OF THE INVENTION

Disk drives, also called disk files, are information storage devices that use a rotatable disk with concentric data tracks containing the information, a head or transducer for reading and/or writing data onto the various tracks, and an actuator connected to a carrier for the head for moving the head to the desired track and maintaining it over the track centerline during read and write operations. There are typically a number of disks mounted on a hub that is rotated by a disk drive motor, and a number of head carriers for accessing the surfaces of the disks. The head carriers are supported on arms attached to the actuator. The most common form of actuator is a rotary voice coil motor (VCM) actuator that can move the head carriers bidirectionally in a generally arcuate path across the tracks on the disks. A housing supports the drive motor and head actuator and surrounds the heads and disks to provide a substantially sealed environment. In conventional magnetic recording disk drives, the head carrier is an air-bearing slider that rides on a bearing of air above the disk surface when the disk is rotating at its operating speed. The slider is maintained next to the disk surface by a biasing force from a suspension that connects the slider to the actuator arm.

In contrast to conventional air-bearing disk drives, contact or near-contact disk drives have been proposed that place the head carrier in constant or occasional contact with the disk or a liquid film on the disk during read and write operations. Examples of these types of disk drives are described in IBM's U.S. Pat. No. 5,202,803 and published European application EP 367510, and U.S. Pat. No. 5,097,368 assigned to Conner Peripherals. In one type of contact recording, the disk drive uses a head-arm assembly in which the head, the carrier, the suspension, the actuator arm, and the electrical conductors are formed as an integrated unit, and the head carrier makes physical contact with the disk surface during read and write operations. In this type of integrated head-arm assembly, as described in U.S. Pat. No. 5,041,932 assigned to Censtor Corporation, a portion of the head pole piece and head carrier wear away due to frictional contact with the disk over the life of the disk drive.

Disk drives have undergone a rapid reduction in size. There are now commercially available disk drives that use disks with a 1.3-inch diameter. As the trend to reduced size continues, it becomes necessary to find smaller and easily manufacturable components. The integrated head-arm assembly is one example of an improved disk drive component that replaces multiple discrete components and separate wiring, and also lends itself to batch fabrication. Because the conventional VCM actuator is relatively complex to build on a small scale and is not readily capable of batch fabrication, the need arises for a new type of disk drive actuator that provides fine positioning of the head on the disk and can be used with very small disk drives.

Micromechanical motors that provide rotary motion of an output shaft have been built on the scale of several hundred microns using semiconductor fabrication techniques. One such motor is the "wobble motor", also called an electrostatic harmonic motor. The version of the wobble motor referred to here is one in which the static and movable elements remain coplanar during operation. A wobble motor has a rotor output shaft located within or surrounding a stator having a plurality of circumferentially-spaced stator elements. As the stator elements are sequentially electrostatically activated with respect to the grounded rotor, the rotor rolls around the stator. Because one complete electrical cycle of all of the stator elements causes the rotor to make much less than one complete revolution, the relatively high ratio of stator electrical cycles to rotor output shaft revolutions generates a high output torque. The following references describe the structure, operation, and fabrication process of micromechanical wobble motors: R. H. Price et al., *Journal of Electrostatics*, 28 (1992), pp. 7–38; S. C. Jacobsen et al., *SPIE* Vol. 1167 *Precision Engineering and Optomechanics* (1989), pp. 122–136; S. C. Jacobsen et al., "Micromotors Split Hairs", *IEEE Potentials*, February 1991, pp. 12–15; M. Mehregany et al., "Friction and Wear in Microfabricated Harmonic Side-Drive Motors", 1990 *IEEE Solid State Sensor and Actuator Workshop—Technical Digest*, pp. 17–22; L. Paratte et al., "A Rigid Ring Electrostatic Harmonic Wobble Motor With Axial Field", 1991 *IEEE International Conference on Solid-State Sensors and Actuators*, pp. 890–893; and U.S. Pat. No. 5,093,594, assigned to Massachusetts Institute of Technology.

What is needed is a micromechanical fine positioner that exploits the batch fabrication and high torque advantages of the wobble motor, but which provides the controlled bidirectional movement necessary for a disk drive actuator, rather than the conventional wobble motor rotational motion.

SUMMARY OF THE INVENTION

The invention is a microfabricated fine positioner that uses a wobble motor and control circuitry for providing bidirectional movement. In one application, the wobble motor positioner serves as the read/write head actuator in a very small magnetic recording disk drive. An integrated head-arm assembly is attached at one end to the rotor of the wobble motor. The other end of the head-arm assembly has a head carrier that is maintained in contact with the disk. Head position error information is read from the disk and used to provide control signals to each of the stator elements. The stator elements are sequentially addressed by applying a voltage from a driver circuit. This causes the rotor to be electrostatically attracted to the activated stators so that the rotor is movable bidirectionally. The read/write head can thus be moved bidirectionally to any of the data tracks on the disk and maintained on a desired data track for reading or writing data.

For a fuller understanding of the nature and advantages of the present invention, reference should be made to the following detailed description taken in conjunction with the accompanying drawings.

DESCRIPTION OF THE PREFERRED EMBODIMENTS

Figure 1:
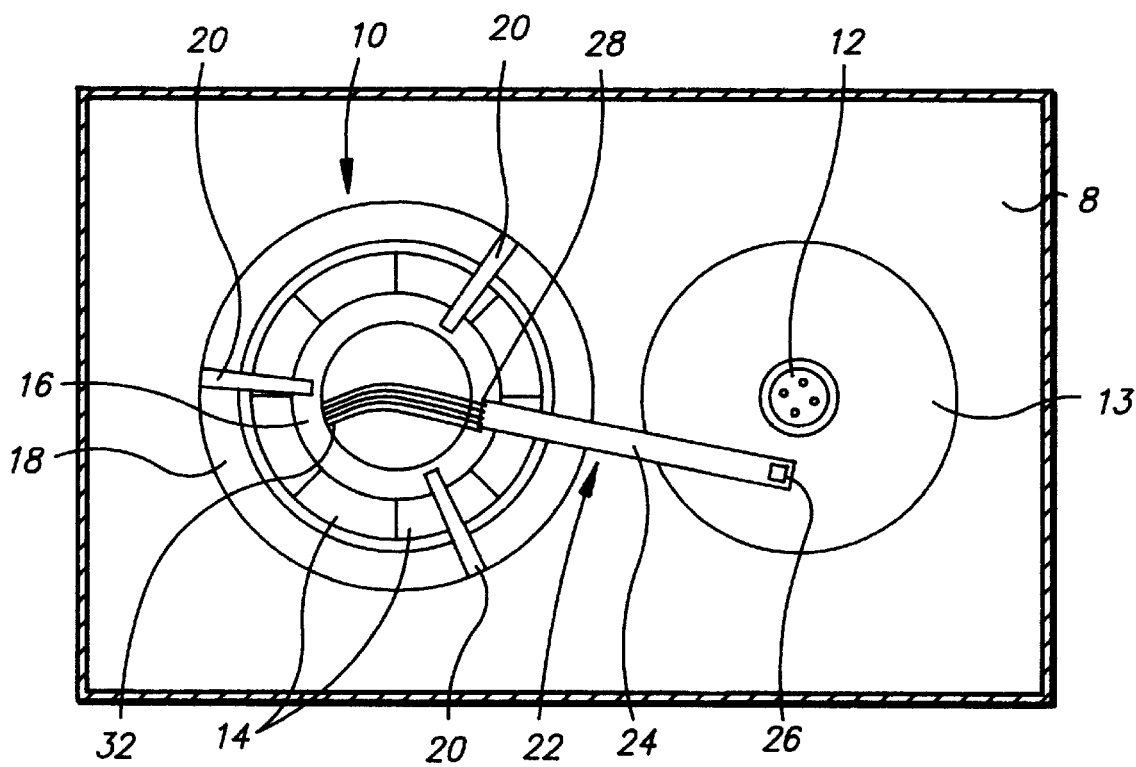
FIG. 1 is a top view of a contact recording disk drive with the cover removed illustrating the wobble motor actuator and attached integrated head-arm assembly.

FIG. 1 is a top view of a contact recording disk drive that has a base 8 on which is mounted a wobble motor rotary actuator 10 and a disk drive motor (not shown). The disk drive motor has a spindle 12 onto which is mounted a magnetic storage disk 13. The rotary actuator 10 includes a plurality of circumferentially arranged stator elements 14, a cylindrically-shaped rotor 16 located within the stator elements 14, and a retainer ring 18. The retainer ring 18 has radially inwardly projecting fingers 20 that extend across the stator elements 14 and make low-friction contact with the top of the rotor 16 to keep the freely movable rotor 16 located within the stator elements 14.

A single-piece integrated head-arm assembly 22 is connected to the rotor 16. The integrated head-arm assembly 22 includes a generally rigid arm 24 that has one end attached, preferably by adhesive bonding, to the rotor 16 and a read/write head carrier 26 located at the distal end outside the rotor 16 and stator elements 14. The read-write head (not shown in FIG. 1) is supported within the head carrier 26 that also includes a bearing pad for contact with the disk 13. Electrical conductors (not shown in FIG. 1) are formed within or patterned on the integrated head-arm assembly 22 and provide electrical connection from the read/write head to electrical contact pads or leads 28 located at the end of the arm 24. A plurality of flexible electrical conductors provide electrical connection from the contact leads 28 on the arm 24 to electrical leads 32 formed on the disk drive base 8. During operation of the disk drive, the stator elements 14 are selectively electrostatically activated to cause the rotor 16 to roll bidirectionally within the stator elements. This results in bidirectional movement of the attached arm 24 to maintain the head on the centerline of a desired data track and to move the head from track to track in response to track seek commands.

Figure 2:
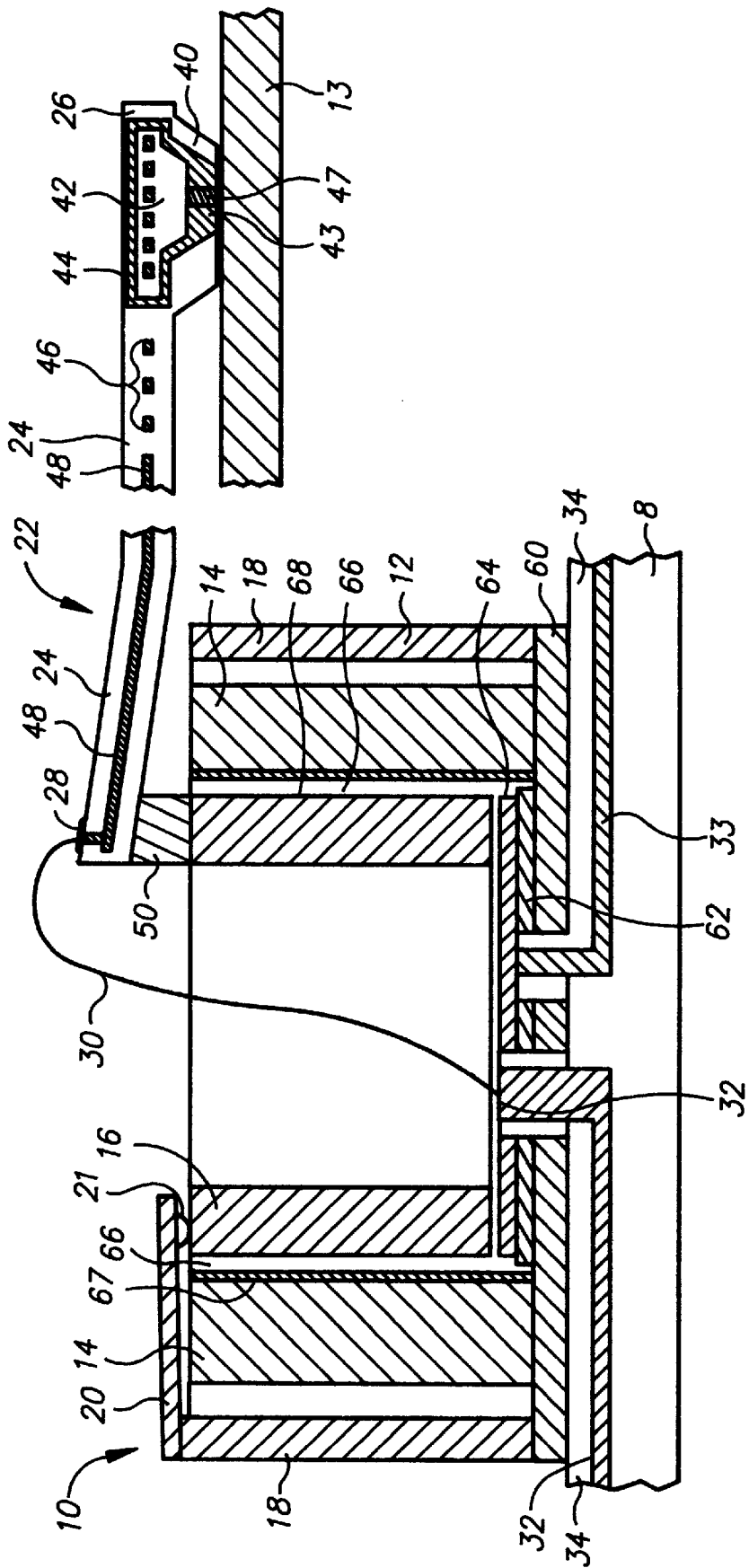
FIG. 2 is a sectional view of the wobble motor actuator and attached integrated head-arm assembly.

FIG. 2 illustrates a sectional view of the wobble motor actuator 10 and head-arm assembly 22 taken through and generally along the axis of the head-arm assembly 22. The head-arm assembly 22 is shown in sectional view with the head carrier 26 in contact with the surface of magnetic recording disk 13. The head carrier 26 has on the end facing disk 13 a wear or bearing pad 40. The head-carrier 26 has embedded within it an inductive read/write head 42 that includes a pole piece 43, a yoke 44, and a horizontally-oriented coil 46. The pole piece 43 comprises adjacent pole tips that are spaced apart to define a magnetic recording gap 47. The coil 46 is electrically connected to conductors 48 embedded within or formed on the arm 24. The conductors 48 terminate at the leads 28 formed on the end of arm 22 that is attached to the wobble motor rotor 16. Flexible electrical conductors 30 connect the leads 28 on arm 24 with leads 32 formed on the disk drive base 8. The disk drive read/write circuitry is patterned within base 8, as shown by the flat conductor portion of leads 32. Other electrical conductors (not shown) are also patterned on base 8 to provide electrical connection to each of the stator elements 14 to apply electrostatic driving voltages, in the manner described later. Electrical conductor 33 is also patterned on base 8 and provides grounding for rotor 16.

In FIG. 2, the head carrier 26 is formed as a single piece and is integrated with the arm 24. The loading force from the head carrier 26 to the disk 13 is provided by the sloped pedestal 50 located between the rotor 16 and the end of arm 22. Thus, a separate suspension, as used in conventional disk drives, is not required. However, it is also possible that the head carrier 26 can be fabricated as a separate segment, referred to as a "chiplet", and attached to a separate suspension. This separate suspension would then be mounted to the arm 24 and the sloped pedestal 50 would not be required. The separate suspension or the sloped pedestal 50 provides a load to the head carrier 26 that is generally perpendicular to the surface of disk 13. This perpendicular load maintains the bearing pad 40 of the head carrier 26 in contact with the surface of disk 13 during rotation of the disk 13.

FIG. 2 also illustrates the various components of the wobble motor actuator 10. A stator platform 60 is formed on base 8. The stator elements 14 and the retainer ring 18 are formed on platform 60. The platform 60 is patterned such that each stator element may be individually activated by independent voltage signals. An insulator layer 62 is formed on platform 60 and a ground plane 64 is formed on the insulator layer 62 beneath rotor 16. The ground plane 64, and thus the rotor 16, is connected to ground through a via and conductor 33 within the base 8. An annular gap 66 is defined by the outer cylindrical surface 68 of rotor 16 and the inner surfaces of the stator elements 14. The annular gap 66 is partially filled by an insulating layer 67 formed on the inner surface of stator elements 14. Alternatively, an insulating layer may be formed on the outer surface 68 of the rotor 16. The rotor 16 is retained inside the stator elements 14 by fingers 20 mounted to the top of retainer ring 18. Each finger 20 has a tip 21 that provides a low-friction contact with the top of the rotor 16. The rotor 16 is thus free to rotate within the space defined by the circumferentially-spaced stator elements 14.

The process for fabricating the wobble motor actuator 10 will be described with reference to FIGS. 3A–3F. The material used for the base 8 that serves as the substrate for the deposited stator elements 14 is a high-expansion material (for example, a material having a linear coefficient of expansion in the range of $7\text{–}25 \times 10^{-6}/°K.$), which is selected to nearly match the expansion coefficient of the material used for the wobble motor rotor and stator elements. Such a material may be a coated metal, such as copper or nickel, or a ceramic, such as alumina or ferrite, or a high coefficient of expansion glass. Alternatively, the substrate can be silicon plated with invar (a Ni—Fe alloy) having a coefficient of thermal expansion matched to that of silicon.

Figure 3A:
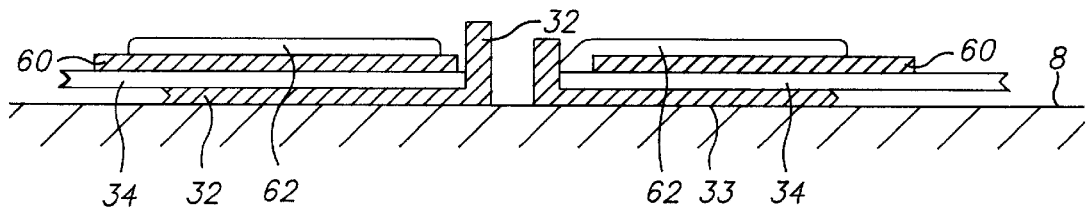
FIGS. 3A–3F are illustrations of the wobble motor actuator during steps in the fabrication process where the stator and rotor are fabricated on separate substrates.

Referring now to FIG. 3A, electrical leads 32 and 33 are formed onto the substrate base 8 using, for example, electroplated copper (Cu). The thickness of the leads 32, 33 is typically 1 micron. An insulating layer 34 approximately 1 micron thick is then deposited over leads 32 and 33 to electrically isolate the leads from the stator platform 60. The insulating material can be alumina ($Al_2O_3$) or silicon dioxide ($SiO_2$). The stator platform 60 is then formed over insulating layer 34 and patterned, by electroplating Cu through a photoresist stencil, to a thickness of about 2 microns. Note that there is a center region of the platform 60 over leads 32 and 33 to allow the leads to pass through the base 8. An insulation layer 62 of alumina or silica approximately 2 microns thick is then deposited on platform 60 to provide electrical isolation between the platform 60 and the next layer, the ground plane 64. After the insulation layer 62 is deposited, vias are opened to allow for subsequent electrical contact to leads 32, 33.

Figure 3B:
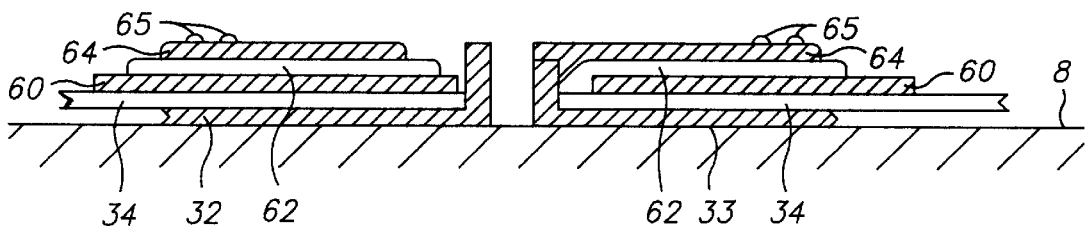

As shown in FIG. 3B, ground plane 64 is then formed by electroplating. During this process, ground plane 64 is connected to lead 33. Ground plane 64 is Cu with a thickness of 1 to 2 microns. Ground plane 64 can also be textured with an additional plating step, such as plating 1 micron of Cu, to minimize friction forces from the bottom of the rotor 16. The texturing is represented in FIG. 3B as bumps 65.

Figure 3C:
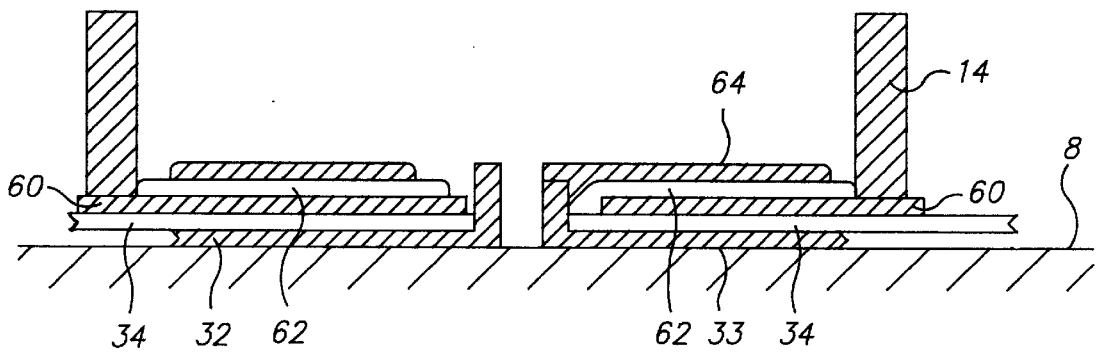

Following the application of high-aspect ratio photoresist, the stator elements 14 are formed by electroplating, as shown in FIG. 3C. The stator elements 14 are formed of plated Cu or Ni with a typical height of 20–60 microns and a typical width of 20–100 microns.

Figure 3D:
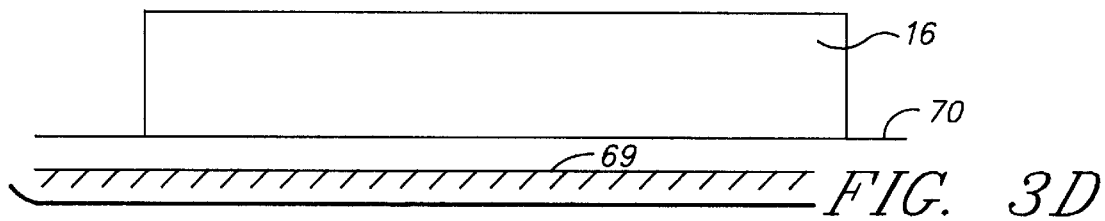
Figure 3E:
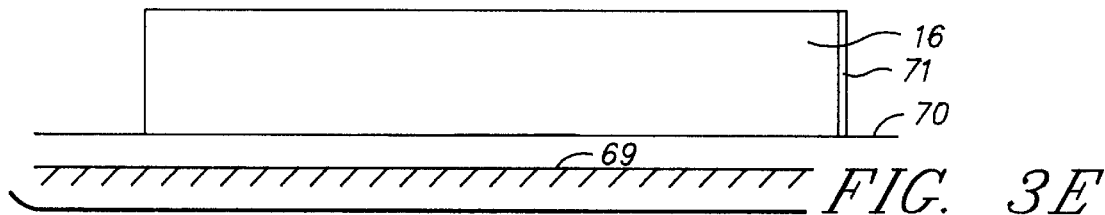
Figure 3F:
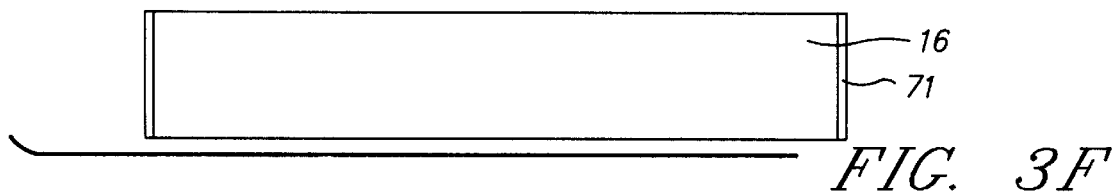

Referring now to FIG. 3D, the rotor 16 is formed on a separate substrate 69. First, a release layer 70 is deposited on substrate 69. The release layer is alumina or a baked photoresist approximately 1 micron thick. The rotor 16 is then plated on a seed layer of Cu or Ni. Typical materials for rotor 16 are copper, nickel (Ni), or nickel-phosphorous (NiP). The typical thickness of rotor 16 is approximately 20–60 microns. After plating the rotor shape using a high-aspect ratio photoresist, the seed layer is removed by sputter etching and the rotor is coated with a conformal insulating dielectric layer 71 of material like $SiO_2$ or silicon nitride ($Si_3N_4$) using plasma-enhanced chemical vapor deposition (PECVD) to a thickness of 0.2–1.0 micron. The insulating layer 71 is anisotropically removed from the top surface of the rotor 16 using reactive ion etching (RIE) which leaves layer 71 only on the outer cylindrical surface of the rotor 16 (FIG. 3E). Finally, the rotor 16 is released from the substrate (FIG. 3F) by dissolving the release layer 70. The rotor 16 is then positioned inside the completed stator elements 14.

Figure 4A:
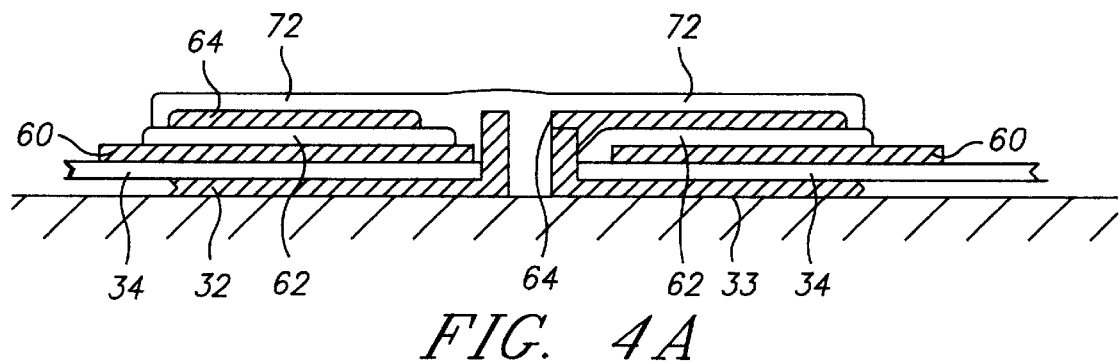
FIGS. 4A–4C are illustrations of the wobble motor actuator during steps in the fabrication process where the stator and rotor are fabricated on the same substrate.
Figure 4B:
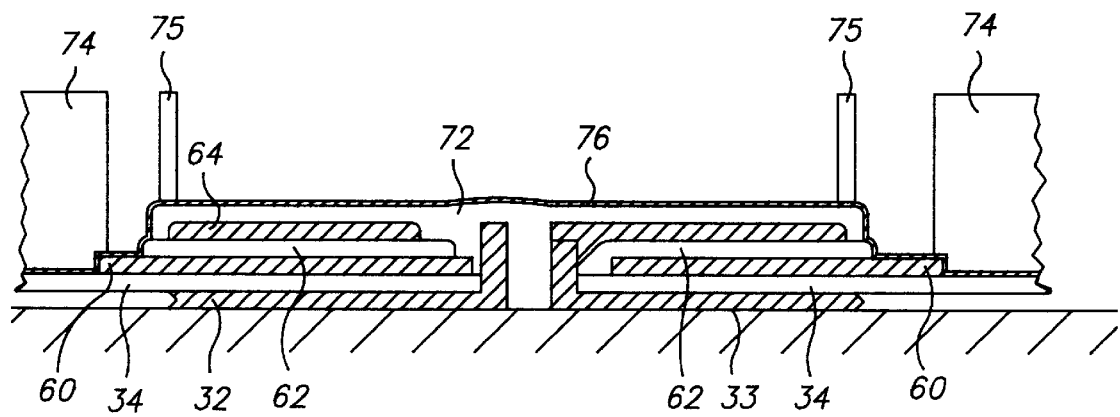
Figure 4C:
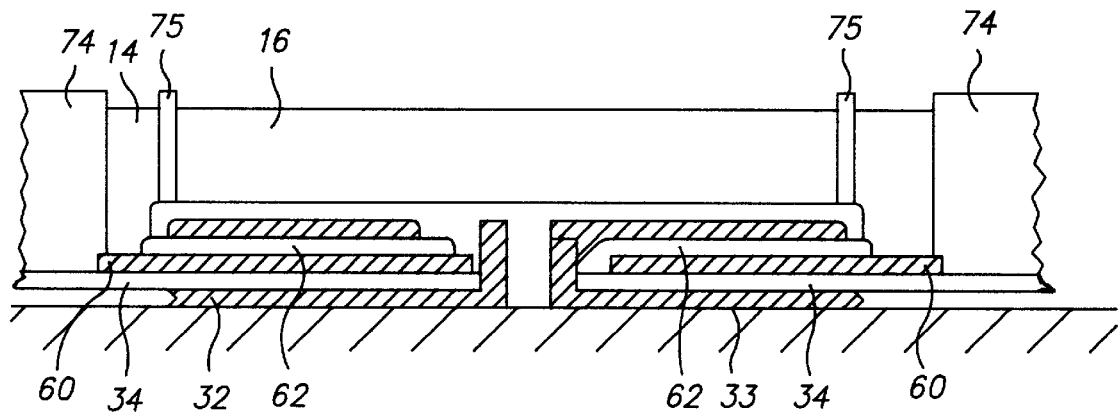

In an alternative fabrication process, as shown in FIGS. 4A–4C, the rotor 16 and stator elements 14 are formed on the same substrate, such as base 8. As shown in FIG. 4A, after the electrical leads 32 and 33, the stator platform 60, insulator layer 62, and ground plane 64 are formed in the manner described previously, and a release layer 72 of hardened photoresist is formed over the ground plane 64. Vias are formed in the release layer 72 to open regions onto the stator platform 60. A seed layer of Cu or Ni 76 is deposited followed by high-aspect ratio photoresist 74 and 75 to define both the stator structure and the rotor structure (FIG. 4B). This is followed by plating simultaneously the rotor 16 and the stator elements 14 (FIG. 4C). The photoresist 74, 75 is then removed, then the unwanted portion of seed layer 76 is removed, and rotor 16 is then released from release layer 72 by dissolving the release layer 72. The insulating dielectric layer 71 is applied to the rotor 16 by first removing the rotor and then depositing insulating layer 71 on the cylindrical surface as described previously.

The retainer ring 18 (FIG. 2) is also formed on a separate substrate and then bonded to platform 60, after which the fingers 20 are bonded to the top of retainer ring 18. Alternatively, a separate top ring with attached fingers, or fingers alone, can be bonded to the top of the stator elements 14. This approach eliminates the need to attach the retainer ring 18 directly to base 8.

FIGS. 2, 3, and 4 illustrate a process for building an inner rotor structure in which the stators surround the rotor. It is also possible, in a similar manner, to build a wobble motor in which an annular-shaped rotor surrounds the stator. In this type of wobble motor, the inner cylindrical surface of the rotor rolls around the outer cylindrical surface of the stator elements.

Following the fabrication of the wobble motor, the separately formed integrated head-arm assembly 22 (FIGS. 1 and 2) and the sloped pedestal 50, if it is to be used to apply the suspension loading force, are bonded to the rotor 16. Thereafter, electrical contact is made by attaching flexible conductors 30 from the leads 28 of the head-arm assembly 22 to leads formed through the platform 60, insulator layer 62, and ground plane 64 for contact with circuitry patterned on base 8.

Figure 5:
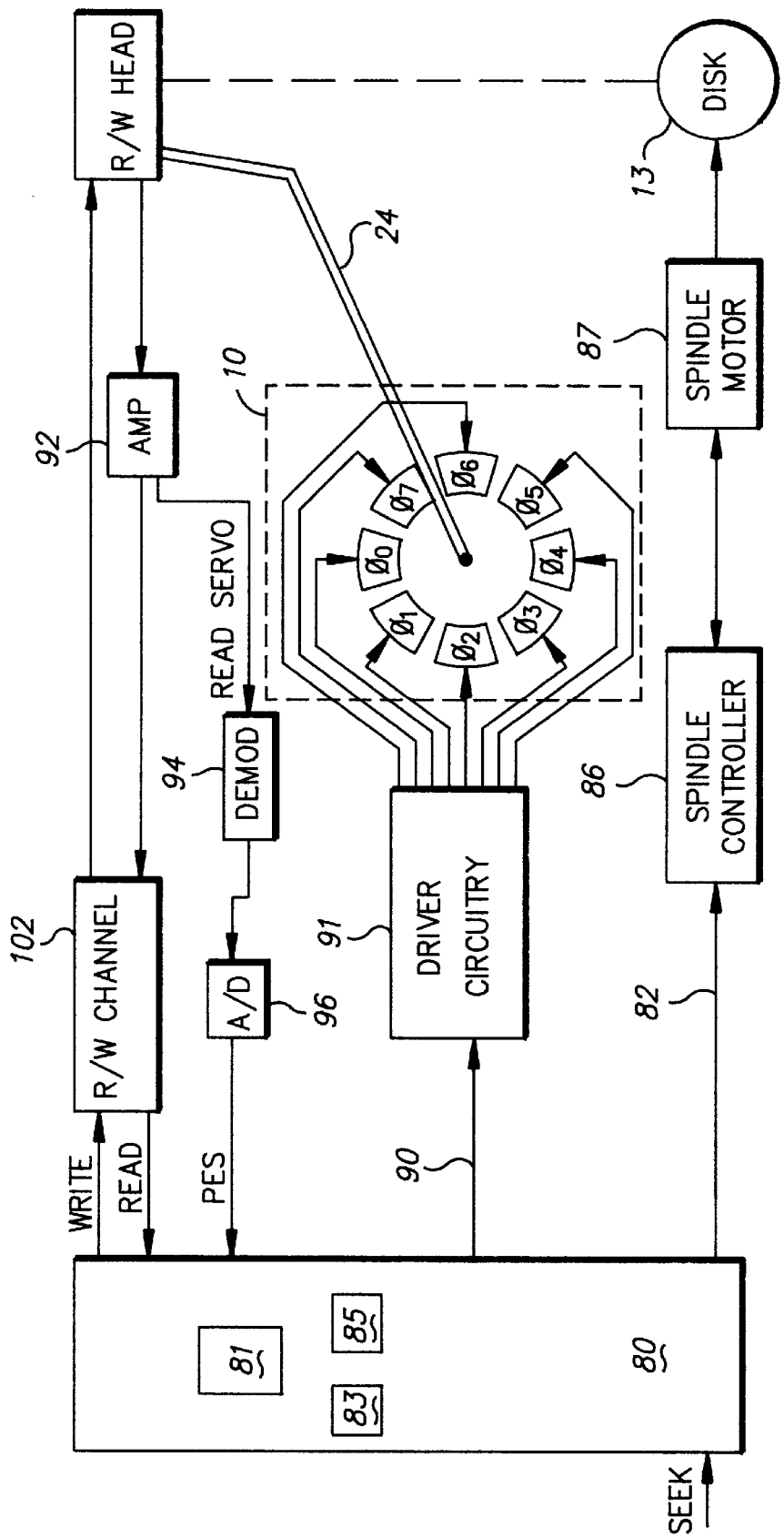
FIG. 5 is a block diagram of the disk drive including servo control circuitry for controlling the positioning of the read/write head on the data tracks of the disk.

Referring now to FIG. 5, the various components of the disk drive are controlled in operation by control signals generated by controller 80. Typically, the controller 80 comprises logic control circuits, memory storage, such as RAM 81, and a microprocessor, for example. The controller 80 generates control signals for various drive operations, such as spindle motor control signals on line 82, read and write signals to read/write channel 102, and track following and seek control signals on line 90 for the wobble motor actuator 10. Controller 80 also includes an address register 83 and a decoder 85 for generating the servo control signal.

The spindle motor control signals on line 82 are sent to spindle controller 86 that controls the current to the armatures of the spindle motor 87 to rotate the disk 13 at a constant rotational speed during disk drive operation.

Data from disk 13 is read by the read/write head, amplified by amplifier 92, and sent to the read/write channel 102. Write signals are sent through read/write channel 102 to the read/write head for writing data on disk surface 13.

The read/write head reads position servo information recorded on the disk 13, typically at equally angularly-spaced servo sectors embedded between the data sectors. Those signals are amplified by amplifier 92, demodulated by demodulator 94, and converted to the digital position error signal (PES) by the analog-to-digital (A/D) converter 96. The track following and seek control signals on line 90 are initiated by a servo control algorithm (FIG. 7) in response to input head PES. Signals on line 90 are sent to wobble motor driver circuitry 91 that provides voltages to the stator elements 14 of wobble motor actuator 10.

Figure 6:
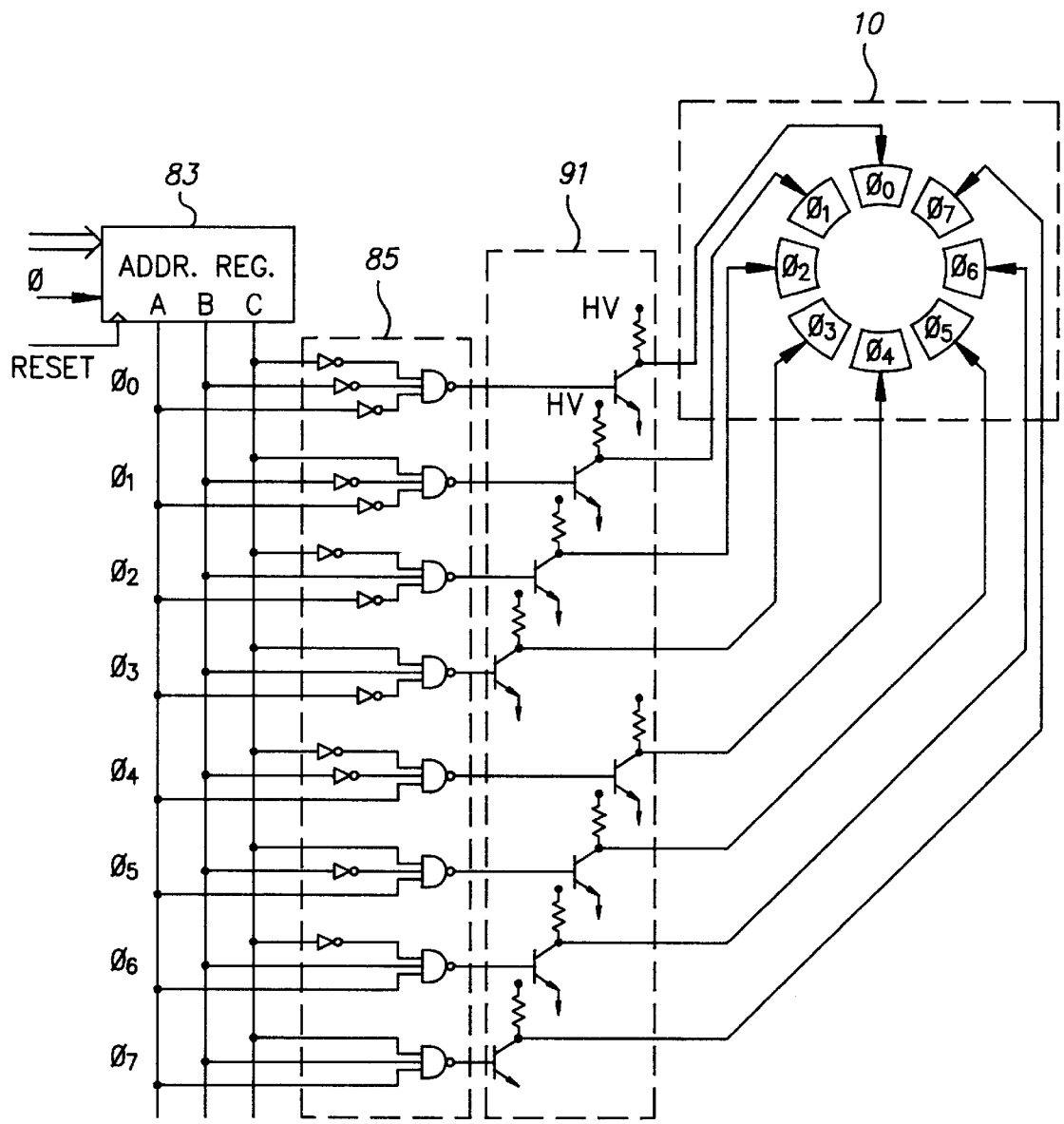
FIG. 6 is a general schematic illustrating the address register, decoder, and driver circuitry for controlling the wobble motor actuator.

The controller 80 includes an address register 83 and a decoder 85, as shown in FIG. 6. The control signal sent on line 90 to driver 91 originates as the stator element address sent to the address register 83. For example, an 8-stator element actuator 10 is shown in FIG. 6, although the number of stator elements is not limited to this number. For an 8-stator element actuator, a 3-bit address (ABC) is adequate. The address register 83 latches the updated address output from the controller 80 in each clock cycle. The address is decoded by the address decoder 85 and sent to the driver 91, which is connected directly to the 8-stator element actuator 10 and supplies driving voltages to the stator elements. The decoder 85 is a typical combinatorial logic circuit. The driver can be implemented as a bipolar circuit connected to the stator elements, as shown in FIG. 6. When a particular stator element is to be addressed, the controller 80 puts the address in the input lines of the address register 83, and the register 83 latches the address in the next clock cycle. The decoder 85 selects the addressed line and turns the corresponding driver transistor off. The series resistor in turn charges up the connected stator element, which attracts the rotor toward it.

Figure 7:
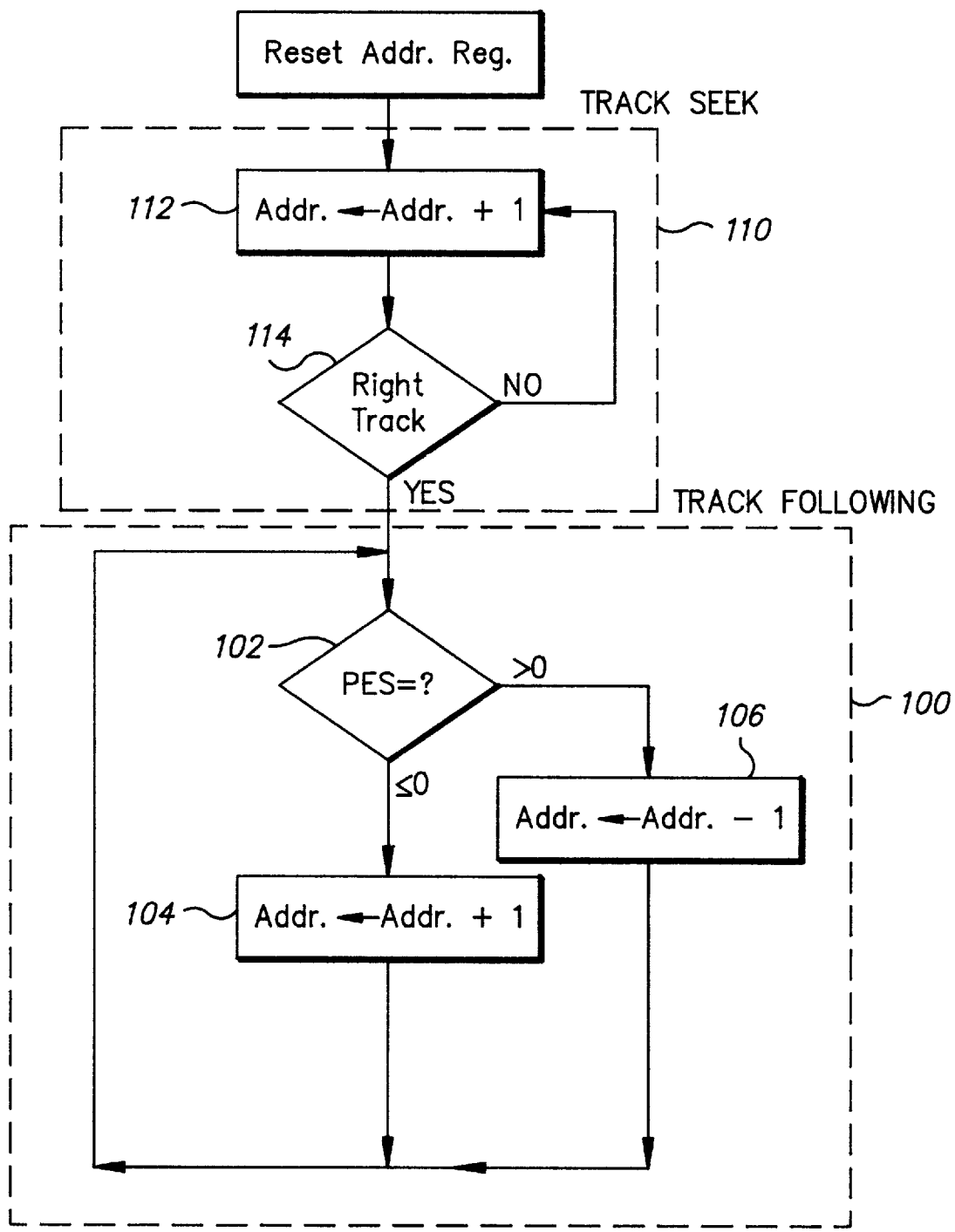
FIG. 7 is a flow chart illustrating the operation of the servo controller during track following and track seeking.

FIG. 7 is a flow chart that explains how the wobble motor actuator 10 performs track seeking and following. A 1-bit sigma-delta control scheme may be used during track following. During the track following block 100, the controller 80 checks the sign of the digitized PES signal (block 102) and the address of the current active element. If the PES is not positive, the controller 80 sends out the address of the next stator element (ADDR=ADDR+1, block 104). Otherwise, the address of the previous element (ADDR= ADDR−1, block 106) is sent out to the address register. With the clock rate much faster than the required actuator bandwidth, the actuator rotor can be balanced in the correct position. The amount of head movement caused by a single stator element address increment or decrement can be appreciated by an understanding of the high "gear ratio" provided by the wobble motor. For example, if the rotor has a radius of 5.000 mm and the annular gap between the rotor and stator is 0.001 mm, then the gear ratio is 5000/1, which means that a single cycle through all 8 stator elements will rotate the rotor 1/5000th of a complete circle. Thus, a single stator element address increment corresponds to angular movement of the rotor approximately 1/40,000th of 360 degrees or 0.009 degrees.

During the track seek block 110, the controller 80 sends out a sequential element address (ADDR=ADDR+1, block 112) until the digitized PES signal indicates that the actuator is on track (block 114). The rotor 16 then rolls in the appropriate direction to pivot the arm 22 radially inward and outward to optimally move and position the read/write head to the desired data track on the disk 13. Then the controller algorithm continues to the track-following block 100. As an alternative to the above-described digital servo, a more conventional analog-based servo may be used.

Figure 8:
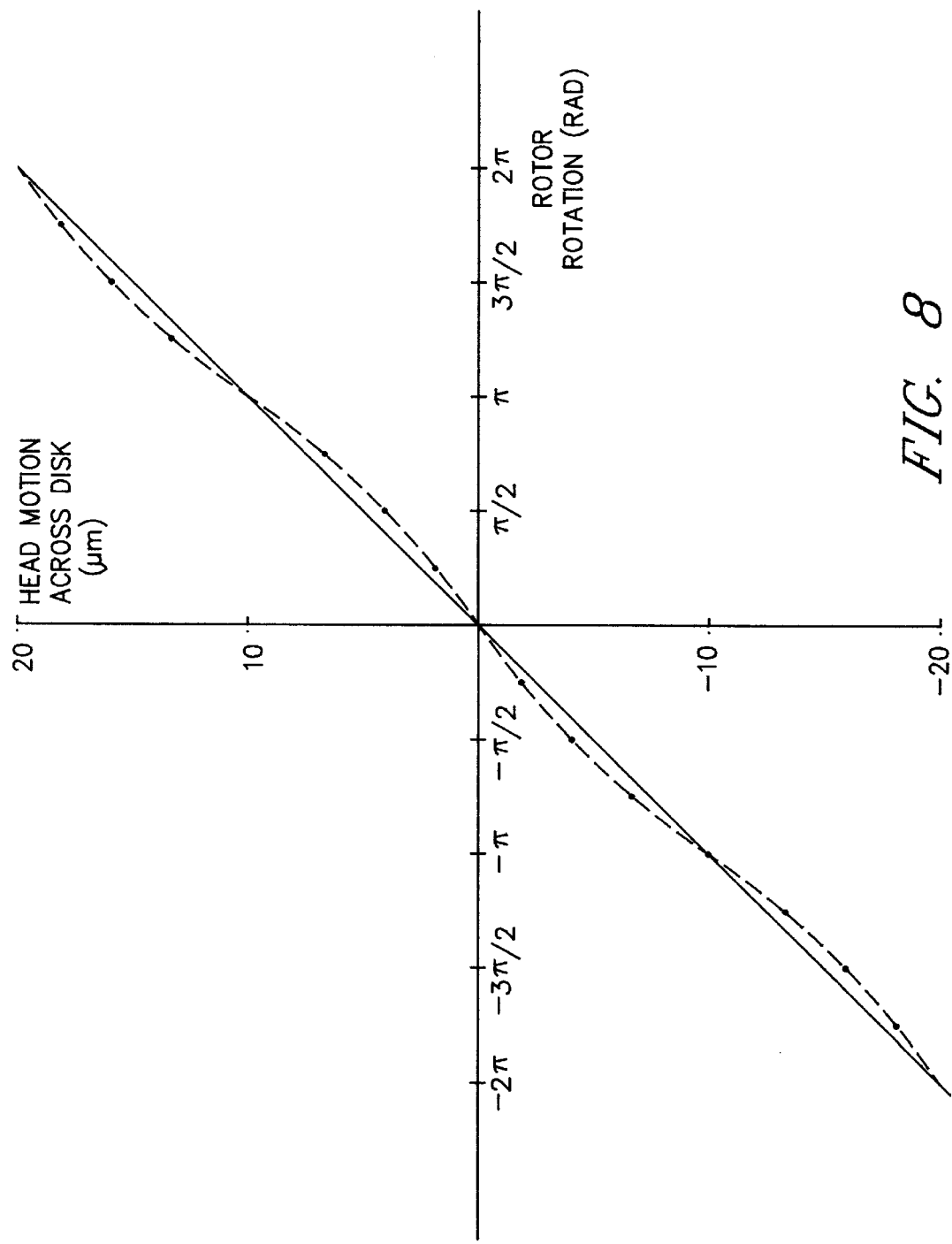
FIG. 8 is a graph of radial and lateral position of the read/write head for a range of angular rotation of the wobble motor rotor.

An improvement in the overall performance of both digital and analog servo approaches may be achieved by using a slightly variable gain control as a function of the rotational position of the rotor with respect to the stator. For example, FIG. 8 shows the motion of the head across a disk as a function of rotor rotation. The data of FIG. 8 is for a head-arm assembly length of 10 mm, a rotor inner radius of 5.001 mm, and a stator outer radius of 5.000 mm, with the rotor being outside the stator. The small deviation from the straight line shown in FIG. 8 indicates the magnitude of gain variation required for this wobble motor. This gain variation can be implemented, for example, by applying a slightly varying voltage level for each stator.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data recording disk drive comprising:

a data disk having a plurality of generally concentric data tracks for the recording of data, the disk having recorded servo position information;

a motor connected to the disk for rotating the disk;

a transducer for reading data from or writing data to the individual data tracks on the disk and for reading servo position information;

a wobble motor actuator comprising a stator having a plurality of circumferentially-spaced stator elements, each of the stator elements having a partial cylindrical surface so that the circumferentially-spaced stator elements define a cylindrical stator surface, and a rotor having a generally cylindrically-shaped rotor surface, the cylindrical stator surface and the rotor surface being spaced apart by an annular gap;

a base for supporting the disk motor and the wobble motor actuator, the base being directly attached to the stator elements and formed of a material having a coefficient of expansion generally the same as the coefficient of expansion of the material used for the stator elements and the rotor;

an arm having one end connected to the rotor and the other end connected to the transducer;

circuitry for generating transducer position error signals in response to servo position information read from the disk by the transducer;

electrical driver circuitry connected to the wobble motor actuator for generating an electrostatic potential between the rotor surface and the stator elements by applying a voltage to each of the stator elements, whereby the cylindrical rotor surface is rolled along the cylindrical stator surface and the attached transducer is moved in a generally arcuate path across the data tracks on the disk; and a controller responsive to the position error signals and coupled to the driver circuitry for signaling the driver circuitry to move the rotor bidirectionally to cause the attached transducer to access different data tracks on the disk, the controller having an adjustable gain whereby a varying voltage is applied to the stator elements as a function of the data track on which the transducer is located, whereby the transducer motion across the disk and along said arcuate path is a substantially linear function of rotor rotational position.

2. The disk drive according to claim 1 wherein the base and the end of the arm connected to the rotor have electrical leads, and further comprising a plurality of flexible electrical conductors interconnecting the leads on the base with the leads on the arm.

3. The disk drive according to claim 1 further comprising a retainer for keeping the rotor generally adjacent to the stator.

4. The disk drive according to claim 1 wherein the transducer is maintained generally in contact with the disk during reading or writing of data.

5. The disk drive according to claim 1 wherein the transducer and the arm are formed as an integrated single-piece head-arm assembly, the assembly including a plurality of patterned electrical conductors formed on the arm and extending from the head to the arm end connected to the rotor.

* * * * *